US011281286B1

(12) United States Patent
Kajuluri et al.

(10) Patent No.: US 11,281,286 B1
(45) Date of Patent: Mar. 22, 2022

(54) SYSTEM TO WAKE ELECTRONIC PLUG-IN DEVICES (EPIDS) AND RELATED METHOD(S) THEREOF

(71) Applicant: Ford Global Technologies, LLC, Dearborn, MI (US)

(72) Inventors: Venkata Kishore Kajuluri, Southgate, MI (US); Xin Ye, Farmington Hills, MI (US); Lisa Therese Boran, Northville, MI (US); Daniel Aaron Zajac, Carleton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/071,372

(22) Filed: Oct. 15, 2020

(51) Int. Cl.
*G06F 1/00* (2006.01)
*G06F 1/3296* (2019.01)
*G07C 5/06* (2006.01)

(52) U.S. Cl.
CPC ............. *G06F 1/3296* (2013.01); *G07C 5/06* (2013.01)

(58) Field of Classification Search
CPC .................................. G01F 1/3296; G07C 5/06
See application file for complete search history.

(56) References Cited

U.S. PATENT DOCUMENTS

| | | | |
|---|---|---|---|
| 8,838,362 B2 | 9/2014 | Higgins et al. | |
| 8,954,230 B2 | 2/2015 | Kalinadhobhotla et al. | |
| 9,840,166 B2 | 12/2017 | Taylor et al. | |
| 10,440,451 B2 | 10/2019 | Balakrishnan et al. | |
| 2015/0382085 A1 | 12/2015 | Lawrie-Fussey et al. | |
| 2016/0049018 A1* | 2/2016 | Gro ...................... | G01R 31/007 701/99 |
| 2017/0028946 A1* | 2/2017 | Mizell ....................... | G06F 8/61 |
| 2019/0392664 A1* | 12/2019 | Determann ............ | H04W 12/50 |

\* cited by examiner

*Primary Examiner* — Nitin C Patel
(74) *Attorney, Agent, or Firm* — Frank L. Lollo (57) ABSTRACT

The present disclosure relates to a system that allows engagement of an electronic plug-in device (EPID) with an on-board diagnostic II (OBD-II) port of a vehicle. The EPID includes an accelerometer and a processor. The accelerometer detects vibrations associated with engine operation. The processor, in communication with the accelerometer, executes instructions to receive an input waveform from the accelerometer. The processor may determine whether the input waveform from the accelerometer is associated with the engine operation. The processor may transition the EPID from a sleep state to a wake state if the input waveform is detected to be associated with the engine operation. In contrast, the processor may transition the EPID from the wake state to the sleep state when the input waveform is not associated with the engine operation.

10 Claims, 4 Drawing Sheets

FIG. 4

SYSTEM TO WAKE ELECTRONIC PLUG-IN DEVICES (EPIDS) AND RELATED METHOD(S) THEREOF

TECHNICAL FIELD

The present disclosure relates to a system and related method(s) to engage an electronic plug-in device (EPID) with an on-board diagnostics II (OBD-II) port of a vehicle.

BACKGROUND

Modern day vehicles provide a provision to connect one or more electronic plug-in devices (EPIDs) with the vehicle. Such one or more EPIDs, when connected to the vehicle, may provide additional functionalities such as real-time tracking of the vehicle, diagnosing a vehicle malfunction, monitoring driving behavior in real-time, and the like. In one example, the EPID may connect with an on-board diagnostics II (OBD-II) port of the vehicle. Typically, the OBD-II port receives diagnostic and functional messages from a central computing device (e.g., an electronic control unit i.e. ECU) of the vehicle. The diagnostic and functional messages are received over an in-vehicle network such as a Controller Area Network (CAN), Media Oriented Systems Transport (MOST), Ethernet, and other networks. Accordingly, the EPID may communicate with the vehicle while being connected to the OBD-II port. These messages may act as a trigger to wake up the EPIDs from a sleep state (a state where the EPIDs preserve power when not in use). However, connecting the EPID to the OBD-II port may allow the EPID to deliver modified messages or sniff the functional messages. In other words, connecting the EPID to the OBD-II port may allow the EPIDs to communicate with the vehicle, which can increase the chances of occurrence of a spoofing attack on the vehicle.

SUMMARY

To avoid situations mentioned, functional messages are not delivered to an electronic plug-in device (EPID) through an on-board diagnostics II (OBD-II) port. However, without the functional messages, the EPID fails to function and lies in the sleep state. The system and method(s) disclosed herein address the need to transition the EPID from a sleep state to a wake state when engaged with the OBD-II port without a need of a trigger provided by the functional messages. In other words, the system does not depend on functional messages to switch the EPID to the wake state. It should be noted that the EPID performs one or more functions in the wake state and conserves energy in the sleep state that is otherwise used to power the EPID.

According to an embodiment of the present disclosure, the system includes an EPID configured to engage with an OBD-II port of a vehicle. The EPID includes an accelerometer and a processor. The accelerometer is configured to detect vibrations associated with an engine operation and/or vehicle motion. The vibrations associated with the engine operation corresponds to the vibrations produced by the working of a combustion engine (e.g. a petrol engine, a diesel engine, and other engines), one or more motors of an electric vehicle, or other vibrations due to vehicle motion. The processor remains in operative communication with the accelerometer to execute instructions. The instructions may include receiving an input waveform from the accelerometer. In an example, the processor transitions the EPID from a sleep state to a wake state upon receipt of the input waveform. The processor may further transition the EPID from the wake state to the sleep state, when the input waveform is not received from the accelerometer.

In one embodiment, the EPID is transitioned from the sleep state to the wake state if the received input waveform is determined to be associated with the engine operation and/or vehicle function. In contrast, the EPID remains in the sleep state if the input waveform is not determined to be associated with the engine operation. In one example, the EPID is configured for programming various electronic devices installed on the vehicle during assembly of the vehicle. The EPID further includes a power source. The EPID consumes a minimal amount of power while in the sleep state.

In another embodiment of the present disclosure, the EPID includes an accelerometer, an output port, and a processor. The accelerometer is configured for detecting vibrations associated with an engine operation. The output port engages the EPID with an OBD-II port of a vehicle. The processor is in operative communication with the accelerometer and is configured to execute instructions. The processor may receive an input waveform from the accelerometer and transitions the EPID from a sleep state to a wake state upon receipt of the input waveform. The processor may further communicate with various electronic components of the vehicle through the OBD-II port of the vehicle.

Yet another embodiment of the present disclosure describes a method of providing an EPID having an accelerometer and a processor. The processor is configured for receiving the input waveform from the accelerometer and transitioning the EPID from a sleep state to a wake state upon receipt of the input waveform. Further, the processor is configured for determining if the input waveform is received from the accelerometer and returning the EPID to the sleep state if the input waveform is not received from the accelerometer.

BRIEF DESCRIPTION OF THE DRAWINGS

The above-mentioned implementations are further described herein with reference to the accompanying figures. It should be noted that the description and figures relate to exemplary implementations and should not be construed as a limitation to the present disclosure. It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with engine compartments have not been shown or described in detail to avoid unnecessarily obscuring descriptions of the embodiments.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one aspect" or "an aspect" means that a particular feature, structure or characteristic described in connection with an embodiment is included in at least one aspect. Thus, the appearances of the phrases "in one aspect" or "in an aspect" in various places throughout this specification are not necessarily all referring to the same embodiment. Furthermore, the particular features, structures, or characteristics may be combined in any suitable manner in one or more aspects.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Figure 1:
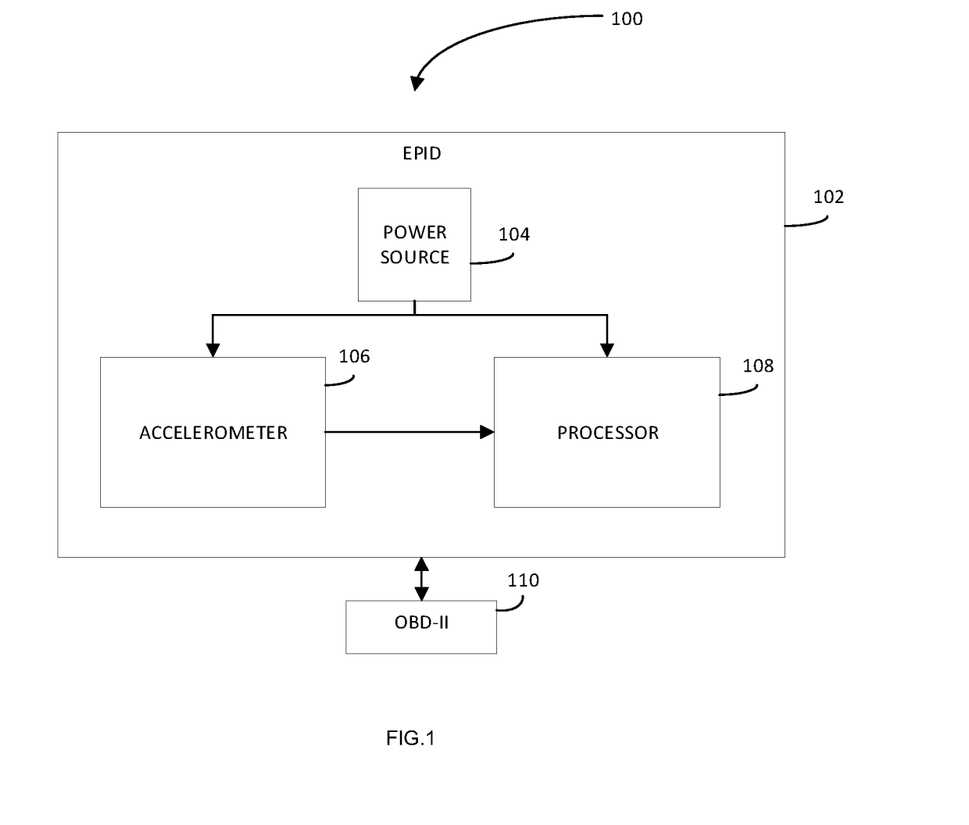
FIG. 1 is an exemplary system having an electronic plug-in device engaged with an on-board diagnostics II port, according to an embodiment of the present disclosure.

FIG. 1 is a system 100 that allows engagement of an electronic plug-in device 102 (hereinafter referred to as EPID 102) with an on-board diagnostics II port 110 (hereinafter referred to as OBD-II port 110) of a vehicle, according to an embodiment of the present disclosure. While not shown explicitly, the OBD-II port 110 may be located in an interior of a vehicle, for instance, under a steering wheel, above the steering vehicle, adjacent to a central console, or the like. The EPID 102 may be an external device that connects with the OBD-II port 110 to send and receive diagnostic and functional messages to/from the vehicle. The diagnostic messages and functional messages are received over an in-vehicle network such as a Controller Area Network (CAN), Media Oriented Systems Transport (MOST), Ethernet, and other networks. For example, the EPID 102 may receive diagnostic messages as error codes that may be generated by a vehicle's computing device (e.g., an ECU) in an event of a vehicle malfunction, which aids in diagnosis and fixing the malfunction. In another example, the EPID 102 may program through functional messages one or more electronic devices that may be installed on the vehicle during assembly of the vehicle. In yet another example, the EPID 102 may be connected to the OBD-II port 110 to monitor vehicle health by reading diagnostic messages received from the vehicle, monitor driving behavior, provide connectivity features to the vehicle by introducing Bluetooth and/or Wireless capability, and the like.

During operation, the EPID 102 is powered on and connected to the OBD-II port 110 of the vehicle. Typically, the OBD-II port 110 includes 16-pins slot that allows the EPID 102 having 16 pins to plug-in. It should be noted that the number of pins available in the OBD-II port 110 may vary based on the vehicle model. For example, the OBD-II port 110 in some vehicles may come with 9-pin slots. The EPID 102 engages with the OBD-II port 110, such that the engagement allows the EPID 102 to communicate with various electronic components of the vehicle including, but not limited to, the ECU and/or other microcontrollers installed on the vehicle. The EPID 102 may draw substantial power while being connected to the OBD-II port 110, therefore, the system 100 is configured to transition the EPID 102 between a sleep state and a wake state. In the sleep state, there is no exchange of message(s) between the various electronic components of the vehicle and the EPID 102, thus the EPID 102 may consume a minimal amount of power. In contrast, the EPID 102 in the wake state may send and/or receive one or more message(s) to and/or from the vehicle, thereby consuming substantial amount of power.

In an example, for a typical output voltage of a car battery that is about 12 volts (V), the EPID 102 in the wake state consumes power of about 26 milliampere hour (mAh) and the EPID 102 in the sleep state consumes power of about 8 mAh. In another example, for a typical output voltage of a car battery, that is about 12 V, the EPID 102 in the wake state consumes power of about 62 mAh and the EPID 102 in the sleep state consumes power of about 2 mAh. From the above examples, it can be seen that while the EPID 102 power consumption can vary depending on the particular EPID 102 and/or the EPID 102 communication with the vehicle, the EPID 102 consumes considerably lesser amount of power in the sleep state as compared to the power consumption during the wake state. Therefore, the sleep mode of the EPID 102 can be considered as a battery saver mode as the power consumption of the EPID 102 is minimal.

When in the sleep state, the EPID 102 typically needs a trigger to transition to the wake state. In the present disclosure, the functional messages are blocked at OBD-II port 110 to avoid possibility of the EPID 102 to sniff the functional messages. Owing to the blocking of the functional messages, the EPID 102 that is in the sleep state does not receive the trigger to transition to the wake state. In order to provide the trigger to the EPID 102 to transition to the wake state, the EPID 102 includes an accelerometer 106 that acts as an alternative to the functional messages to transition the EPID 102.

The accelerometer 106 includes a sensor or any other suitable device configured to detect vibrations and/or acceleration related to one or more components of the vehicle. Some of the exemplary accelerometers that may be employed for the implementation of present disclosure include, but are not limited to, tri-axial accelerometer, resonance accelerometer, seat pad accelerometer, shear mode accelerometer, and the like. In the illustrated embodiment, the accelerometer 106 detects the vibrations associated with an engine operation of the vehicle to trigger the EPID 102 to the wake state. The vibrations associated with the engine operation corresponds to the vibrations produced by a combustion engine (e.g. a petrol, a diesel engine, and other engines), by one or more motors of an electric vehicle, and other vibrations due to vehicle motion. It may be contemplated that the accelerometer 106 may filter out the vibrations that are not associated with the engine operation. To that end, the accelerometer 106 may receive the vibrations generated from one or more sources that are not directly related to the engine operation. These vibrations may act as noise vibrations that may inadvertently transition the EPID 102 to the wake state. Exemplary sources generating the noise vibrations include, but not limited to, slamming of vehicle door, heavy vehicle passing by the subject vehicle, and the like.

The accelerometer 106 may include one or more filters (not shown) configured to detect and/or remove the noise vibrations received by the accelerometer 106 from the sources other than the engine operation. In may be understood that the one or more filters may not be inbuilt in the accelerometer 106 and may exist as a standalone component of the EPID 102 (shown in FIG. 2). More details pertaining to the filters used in removing the noise vibrations are provided in FIG. 2. Once the noise vibrations are detected and removed by the filters, the accelerometer 106 generates an input waveform (may also be referred to as 'voltage waveform') corresponding to the vibrations associated with the engine operation. Once the input waveform is generated, a processor 108 positioned inside the EPID 102 communicates with the accelerometer 106 to receive the input waveform. In one embodiment, the accelerometer 106 is an integral part of the processor 108. Upon the receipt of the input waveform, the processor 108 transitions the EPID 102 to the wake state. The processor 108 transitions the EPID 102 from the wake state to the sleep state or the EPID remains in the sleep state when the processor 108 stops receiving the input waveform from the accelerometer 106, that is the accelerometer 106 stops receiving vibrations from the engine operation. In one or more embodiments, the transition of the EPID 102 from the wake state to the sleep state occurs after a predetermined time of the accelerometer 106 being inactive. Therefore, the EPID 102 remains in the wake state until the predetermined time has elapsed. This might be helpful in situations for example when the vehicle is stationary/halts at a traffic signal. After completion of the predetermined time the processor 108 transitions the EPID 102 from the wake state to the sleep state.

In an alternate embodiment, the EPID 102 may not include the filters to remove the noise vibrations. Accordingly, the input waveform received by the processor 108 may also include the input waveform associated with the noise vibrations. The processor 108 is configured to determine whether the input waveform received from the accelerometer 106 is associated with the engine operation of the vehicle. Accordingly, the processor 108 transitions the EPID 102 to the wake state if the input waveform is associated with the engine operation. Alternatively, the processor 108 transitions the EPID 102 to the sleep state or the EPID 102 remains in the sleep state, upon determining that the input waveform is not associated with the engine operation. The manner in which this determination is made is explained below. Therefore, it may be understood that the input waveform generated and received due to the engine operation will only act as a trigger to wake the EPID 102. Accordingly, the EPID 102 may remain in the sleep state if the received input waveform is not determined to be associated with the engine operation.

Those skilled in the art will appreciate that the processor 108, in an example, may be an off-the-shelf microcontroller with an integrated processor core, memory, and programmable peripherals. The processor 108, in another example, may be a custom-made processor with proprietary components or other type of hardware and/or software solution configured to transition the states of the EPID 102.

In an exemplary embodiment, the processor 108 includes a memory module (not shown) for storing the input waveforms received from the accelerometer 106. The memory module also stores information that may be used to determine if the received input waveform is associated with the engine operation. To that end, the memory module includes a predefined voltage range such that a voltage within the said predefined voltage range would be classified as the input waveform associated with the engine operation. The processor 108 matches the received input waveform with the predefined voltage range to determine if the input waveform falls in the range to be classified as been associated with the engine operation. In an example, the memory module may store computer-readable instructions that are executed by the processor 108 for performing one or more functions of the EPID 102.

One or more components of the EPID 102, including the processor 108 and the accelerometer 106, would need power to perform functions thereof, as stated above. To that end, the EPID 102 includes a power source 104 that provides power to the one or more components of the EPID 102. In one example, the power source 104 may be a single coin battery. In another example, the power source 104 may be one or more rechargeable batteries. In yet another example, the power source 104 may be one or more disposable batteries. It may be contemplated that the power source 104 may include any suitable component or device that is capable of providing power to the components of the EPID 102. It should be noted that the power source 104 may also be referred to as a power cell according to embodiments of the present disclosure.

In an alternate embodiment, the EPID 102 may draw power from a battery (not shown) of the vehicle in the wake state, while continuing to draw power from the power source 104 in the sleep state. Since the EPID 102 consumes more power in the wake state as compared to the sleep state, using vehicle's battery as the power source 104 in the wake state may result into a longer shelf life of the power source 104.

Figure 2:
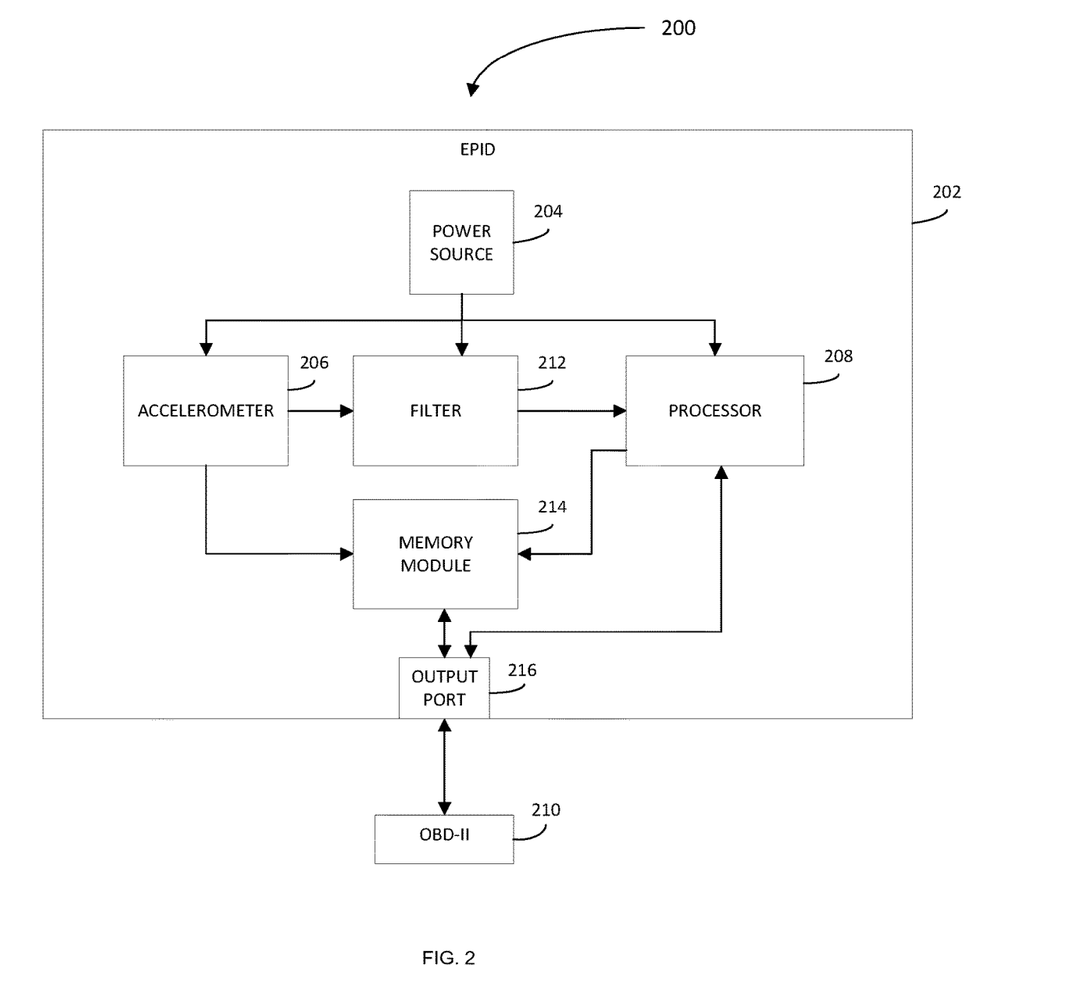
FIG. 2 illustrated a system according to another embodiment of the present disclosure.

FIG. 2 is a system 200 that allows engagement of an electronic plugin device 202 (hereinafter referred to as EPID 202) with an on-board diagnostics port II 210 (hereinafter referred to as OBD-II port 210), according to another embodiment of the present disclosure. As illustrated in FIG. 2, the EPID 202 is coupled to the OBD-II port 210 via an output port 216. Such coupling may allow exchange of messages between the EPID 202 and the OBD-II port 210. For instance, the EPID 202 while connected to the OBD-II port 210 may receive message(s) that include one or more error codes related to a malfunctioned vehicle component. In another example, the EPID 202 may program one or more electronic devices installed on the vehicle, while being connected to the OBD-II port 210.

Similar to the EPID 102 of FIG. 1, the EPID 202 is configured to transition between a wake state and a sleep state. To that end, in case the EPID 202 is in the sleep state, the EPID 202 would require a trigger to transition to the wake state. The trigger may include an input waveform (also referred to as a voltage waveform, similar to the input waveform described in context with FIG. 1) generated by an accelerometer 206 of the EPID 202, based on the vibrations associated with the engine operation. In the illustrated embodiment, the input waveform generated by the accelerometer 206 also includes noise vibrations from other sources, such as slamming of vehicle door and other sources not related to the engine operation.

The EPID 202 further includes a processor 208, a filter unit 212, and a memory module 214. The filter unit 212 is positioned between the accelerometer 206 and the processor 208, such that the input waveform may pass through the filter unit 212 before it reaches the processor 208. The filter unit 212 is configured to attenuate the input waveforms that are generated as a result of vibrations coming from the sources other than the engine operation. In other words, the filter unit 212 may allow passage of only the input waveforms that are associated with the engine operation. As a result, the processor 208 transitions the EPID 202 from the sleep state to the wake state only upon the receipt of the input waveform that is associated with the engine operation.

The processor 208 transitions the EPID 202 to the sleep state or the EPID 202 remains in the sleep state if the input waveforms, associated with the engine operation, are not received from the accelerometer 206. It may be contemplated that the processor 208 transitions the EPID 202 between the wake state and the sleep state similar to the processor 108 as described with reference to the FIG. 1.

Further, the filter unit 212 may include one or more filters. In one example, the filter unit 212 may include one or more analog filters, whereas in another example, the filter unit 212 may include one or more digital filters. Further, the filter unit 212 may include one or more bandpass filters such that the one or more bandpass filters may be a high pass filter and/or a low pass filter. In an instance, the one or more bandpass filters may be tunable.

According to an embodiment of the present disclosure, the accelerometer 206 communicates with the memory module 214 in a manner that the vibrations received by the accelerometer 206 are stored in the memory module 214. In addition, the input waveforms that are generated by the accelerometer 206 as a result of the received vibrations are also are stored in the memory module 214. Eventually, the generated input waveforms are received by the processor 208 such that the input waveforms generated from noise vibrations are removed by the filter unit 212. The processor 208 may further communicate with the memory module 214 to store the received input waveforms in the memory module 214. Therefore, the memory module 214 acts as a repository, where the information pertaining to the vibrations and corresponding input waveforms is stored. It may be contemplated that the memory module 214 also stores input waveforms that are used to transition the EPID 202 between the wake state and the sleep state.

The EPID 202 may include a power source 204 that provides power to one or more components of the EPID 202. The power source 204 may include any suitable component or device that is capable of providing power to the components of the EPID 202 including, but not limited to, a power cell, disposable or rechargeable batteries, and the like.

In one example, the input waveforms received by the processor 208 may be processed using techniques such as pattern recognition techniques and/or other machine learning techniques. The pattern recognition techniques and/or other machine learning techniques may be employed directly on the EPID or be done in the cloud, back end servers, and/or prior to programming by another device. The example described herein may be carried out using the configurations illustrated in FIGS. 1 and 2, for example, and various elements of these figures are referenced in explaining example.

The input waveforms that are associated with the engine operation and/or other sources may be stored in the memory module. The memory module may also store one or more parameters and the associated values that corresponds to the engine operation. The stored values of these parameters may allow self-learning of the EPID. The machine learning techniques may mathematically extract the values of the parameters from the input waveforms. Examples of the parameters that may be considered by the machine learning techniques may include magnitude of the acceleration, derivatives of one or more parameters, integrals of one or more parameters, and/or other mathematical derivatives related to the input waveforms. For example, the machine learning techniques may extract parameters such as the frequency of the input waveforms that are stored in the memory module.

Upon extraction of parameters of the input waveforms, the machine learning techniques compare the values of the extracted parameters of the input waveforms with the values of the stored parameters, such as, frequencies corresponding to the engine operations. The machine learning technique determines that the input waveform corresponds to the engine operation if the extracted parameters match with the stored parameters. The frequency of each input waveform may be stored in the memory module such that any upcoming input waveform may be first compared with the frequency of the engine operations. The machine learning techniques provide signals to the processor to indicate a match signifying that the input waveforms correspond to the engine operation. Further, the machine learning techniques provide signals to the processor to indicate a mismatch signifying that the input waveforms do not correspond to the engine operation. The processor may use the signals provided by the machine learning techniques to transition the EPID between the wake state and the sleep state in less amount of time. In addition, this may save power required for processing each new input waveform by the processor.

Figure 3:
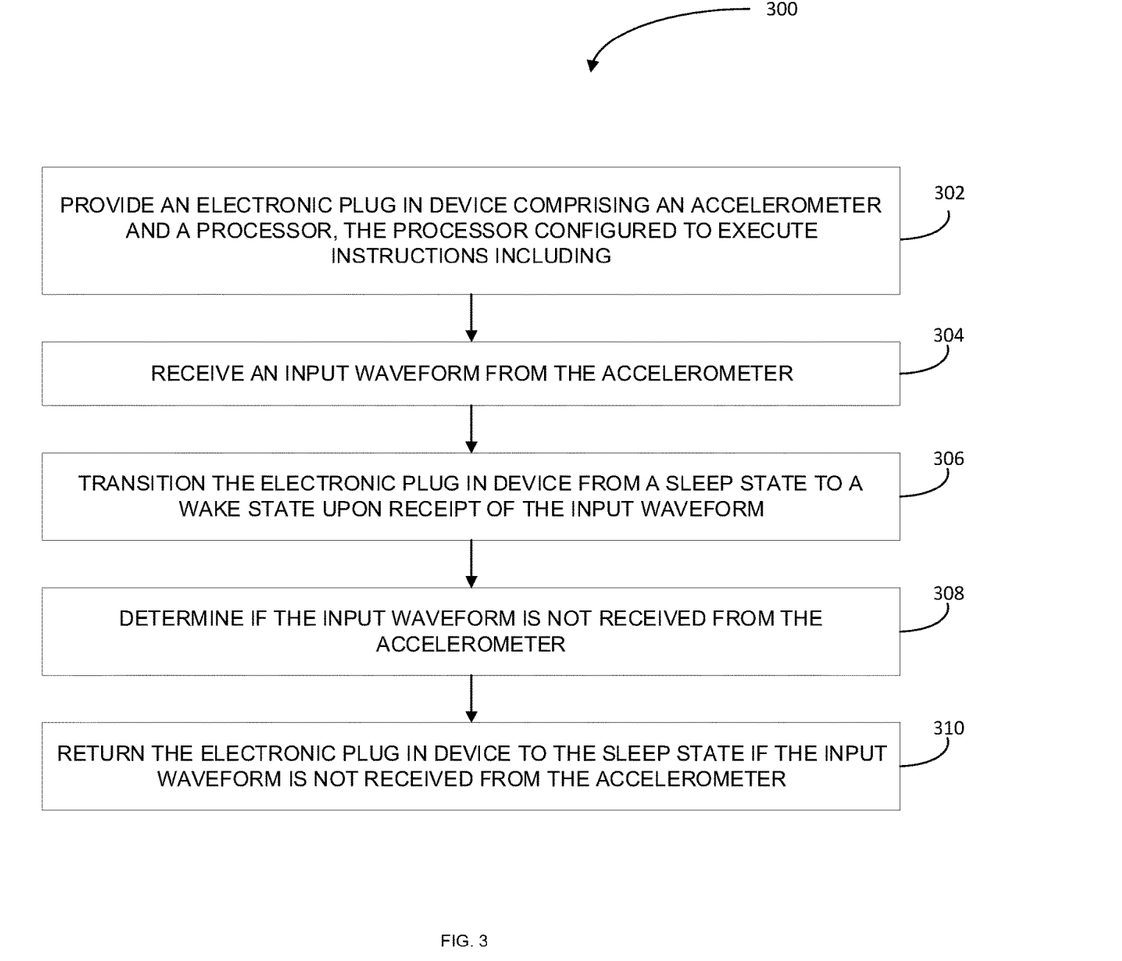
FIG. 3 is a flow diagram representing a method implemented to transition an electronic plug-in device between a wake state and a sleep state, according to an embodiment of the present disclosure.

FIG. 3 is a flow diagram representing a method 300 implemented to transition an EPID between a wake state and a sleep state, according to an embodiment of the present disclosure. The method 300 is provided by way of example, as there are a variety of ways to carry out the method. The method 300 described below may be carried out using the configurations illustrated in FIGS. 1 and 2, for example, and various elements of these figures are referenced in explaining example method 300. Each step shown in FIG. 3 represents one or more processes, methods or subroutines, carried out in the example method 300. Furthermore, the illustrated order of steps is illustrative only and the order of the steps may change according to the present disclosure. Additional steps may be added or fewer steps may be utilized, without departing from the scope of the present disclosure. The example method 300 may begin at step 302.

The step 302 provides the EPID, having the accelerometer and the processor, connected to the OBD-II port of the vehicle. It should be noted that the processor of the EPID is configured to execute instructions received from the accelerometer and/or other components of the EPID. The instructions, in one example, are stored in the memory module, wherein the memory module may be a subcomponent of the processor. However, in another example, the memory module may exist external to the processor and is a component of the EPID.

At step 304, the processor receives the input waveform from the accelerometer. To accomplish this, the accelerometer detects the vibrations associated with the engine operation of the vehicle and converts the vibrations to the input waveform. For example, the vehicle engine vibrates at the time of ignition. These engine vibrations are detected by the accelerometer, which are then converted to the input waveform. These input waveforms may be voltage waveforms that are inputted to the processor. It should be noted that the accelerometer removes the vibrations that are not associated with the engine operation either using inbuilt filters or with standalone filter units or filter modules, as explained in the previous embodiments. Upon receipt of the input waveform from the accelerometer, the processor, at step 306, transitions the EPID from the sleep state to the wake state.

In an alternate embodiment, the accelerometer may not remove the noise vibrations and the input waveform may include vibrations from both the engine operation and other sources. The processor determines whether the input waveform from the accelerometer is associated with the engine operation. The processor transitions the EPID from the sleep state to the wake state upon receipt of the input waveform if the input waveform is determined to be associated with engine operation. The processor transitions the EPID to the sleep state or the EPID remains in the sleep state upon determination that the input waveform is not associated with the engine operation.

At step 308, the processor determines if the input waveform is not received from the accelerometer. At step 310, the processor returns the EPID to the sleep state if the input waveform is not received from the accelerometer and after a predefined threshold is met. In one embodiment the predefined threshold is a predetermined time of accelerometer inactivity. Therefore, if the input waveform is not received from the accelerometer in the predetermined time, the processor determines the accelerometer to be inactive and returns the EPID to the sleep state. Thereby, the input waveform is the trigger to transition the EPID from the sleep state to the wake state.

Figure 4:
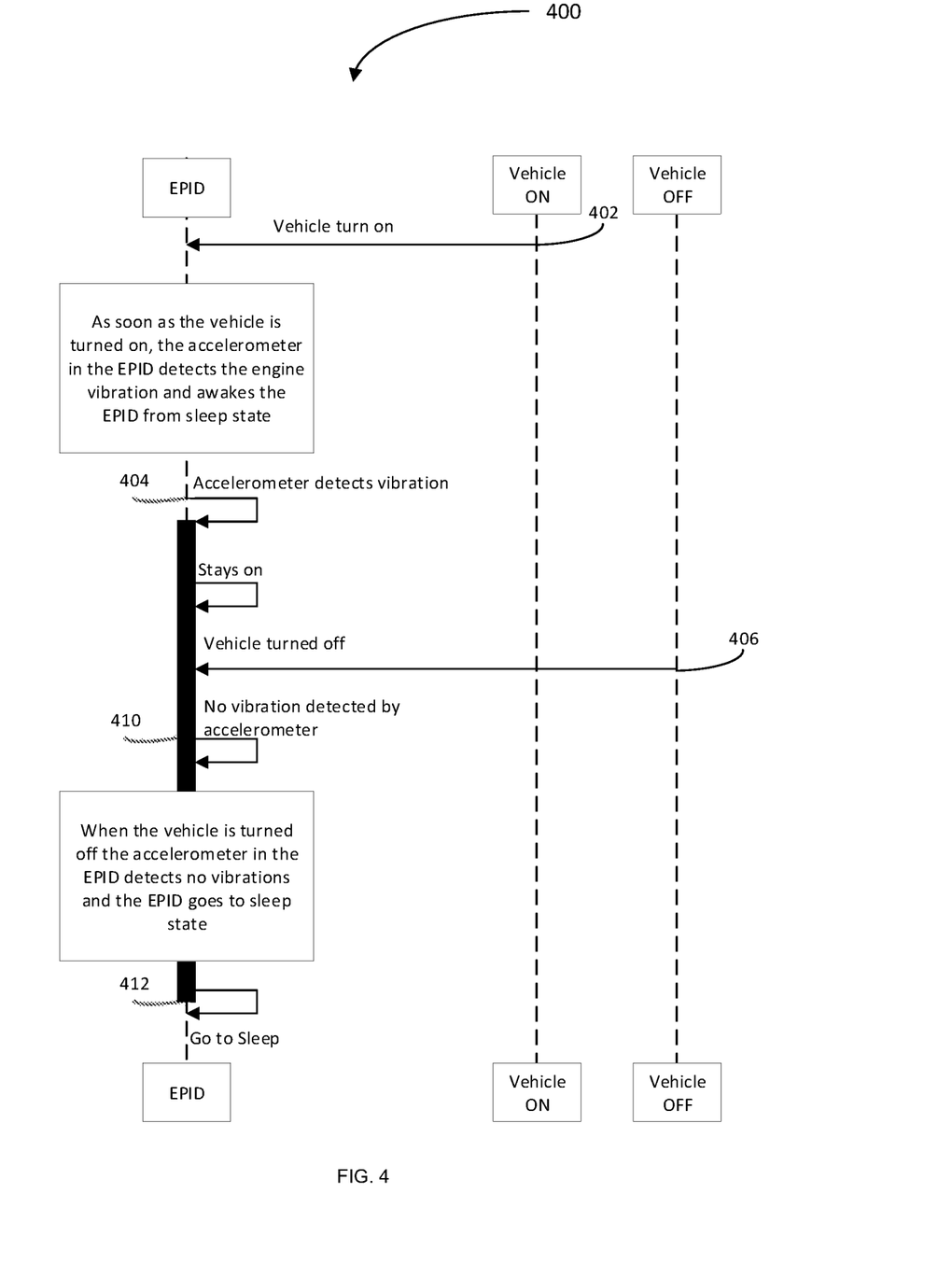
FIG. 4 is an exemplary method used to operate an electronic plug-in device in a vehicle, according to an embodiment of the present disclosure.

FIG. 4 is an exemplary method 400 used to operate the EPID (102 and 202, as shown in FIGS. 1 and 2 respectively) in a vehicle. The method 400 described herein may be carried out using the configurations illustrated in FIGS. 1 and 2, for example, and various elements of these figures are referenced in explaining example method 400. It may be understood that the method 400 may entail one or more steps of the method 300 as outlined in FIG. 3.

The method 400 may be implemented when the EPID is turned on and connected to the OBD-II port of the vehicle. The method begins at an instant 402, where the vehicle is turned on, such that the ignition is on and the engine in the vehicle vibrates and causes minor vibrations in the vehicle. At the instant 404, the accelerometer in the EPID detects the engine vibrations and generates the input waveforms. In an embodiment, the accelerometer may filter out the vibrations that are not generated from the engine operation via a filter module. As a result, the accelerometer generates input waveforms corresponding to the vibrations generated only as a result of the engine operation. The accelerometer provides the generated input waveforms to the processor of the EPID. The processor upon receiving the input waveform awakes the EPID, which transitions the EPID from the sleep state to the wake state. In other words, the input waveforms act as the trigger to the processor to transition the EPID from the sleep state to the wake state. The EPID continues to stay in the wake state till the accelerometer continues detecting the engine vibrations. In an alternate embodiment the input waveforms may also include the noise vibrations, and the processor transitions the EPID to the wake state only upon determination that the input waveforms are associated with the vibrations from the engine operation and not the noise vibrations. The EPID transits to the sleep state or remain in the sleep state if the input waveforms are determined as noise vibrations and not associated with the engine operation.

At an instant 406, the vehicle is turned off, that is, the engine of the vehicle is turned off. As a result, at the instant 410, the accelerometer stops receiving the vibrations from the engine. In other words, the accelerometer is not generating the input waveforms corresponding to the engine operation due to the absence of engine operation. At an instant 412 the processor, due to absence of the input waveforms, turns the EPID off that is transitions the EPID from the wake state to the sleep state. In an example, the transition from the sleep state to the wake state or the transition from the wake state to the sleep state is an immediate response to the engine operation. In another example, the transition from the sleep state to the wake state or the transition from the wake state to the sleep state may be a delayed response corresponding to the engine operation, wherein delay in time is predetermined. A watchdog timer, in an example, may be used for establishing the delay.

We claim:

1. A system comprising:
    a vehicle with a communication port;
    an electronic plug-in device for engagement with the communication port of the vehicle, the electronic plug-in device comprising:
        an accelerometer adapted to receive engine vibrations and configured to generate an engine on signal when the engine vibrations are present; and
        a processor in operative communication with the accelerometer and configured to execute instructions including:
            receiving the engine on signal indicative of engine operation from the accelerometer;
            transitioning the electronic plug-in device from a sleep state to a wake state upon receipt of the engine on signal; and
            exchanging diagnostic messages with the vehicle when in the wake state.

2. The system of claim 1, wherein the electronic plug-in device further comprises a power cell.

3. The system of claim 1, wherein the processor is configured to execute instructions further comprising:
    transitioning the electronic plug-in device from the wake state to the sleep state when the engine on signal is not received from the accelerometer.

4. The system of claim 3, wherein the communication port is an on-board diagnostic communication port.

5. An electronic plug-in device for connecting to an onboard diagnostics port of a vehicle, comprising:
    an accelerometer adapted to receive vibrations indicative of operation of the vehicle and configured to generate an engine on signal;
    an output port for engagement with the onboard diagnostics port of the vehicle;
    a processor in operative communication with the accelerometer and including computer executable instructions stored thereon to:
        receive the engine on signal from the accelerometer; and
        transition the electronic plug-in device from a sleep state to a wake state upon receipt of the engine on signal; and
        communicate with one or more electronic components of the vehicle through the onboard diagnostics port of the vehicle while in the wake state.

6. The electronic plug-in device of claim 5, further comprising a power cell.

7. The electronic plug-in device of claim 5, wherein the processor includes computer executable instructions for transitioning the electronic plug-in device from the wake state to the sleep state when the engine on signal is not received from the accelerometer.

8. A method, comprising:
    providing an electronic plug-in device comprising an accelerometer and a processor, the processor including a non-transitory storage including computer executable instructions stored thereon for:
    receiving an input signal indicative of engine operation from the accelerometer upon detection of engine vibration;

transitioning the electronic plug-in device from a sleep state to a wake state upon receipt of the input signal if the input signal is determined to be associated with engine operation and remaining in the sleep state upon receipt of the input signal if the input signal is not determined to be associated with engine operation;

determining if the input signal is not received from the accelerometer; and returning the electronic plug-in device to the sleep state if the input signal is not received from the accelerometer.

9. The method of claim 8, further comprising: filtering vibrations not associated with the engine operation from the input signal.

10. The method of claim 8, further comprising:

determining whether the input signal from the accelerometer is associated with the engine operation.

\* \* \* \* \*